United States Patent
Kapoor et al.

(10) Patent No.: US 9,613,209 B2
(45) Date of Patent: Apr. 4, 2017

(54) AUGMENTING SYSTEM RESTORE WITH MALWARE DETECTION

(75) Inventors: Vishal Kapoor, Seattle, WA (US); Jason Joyce, Redmond, WA (US); Gregory Nichols, Bellevue, WA (US)

(73) Assignee: MICROSOFT TECHNOLOGY LICENSING, LLC., Redmond, WA (US)

( * ) Notice: Subject to any disclaimer, the term of this patent is extended or adjusted under 35 U.S.C. 154(b) by 0 days.

(21) Appl. No.: 13/334,060

(22) Filed: Dec. 22, 2011

(65) Prior Publication Data

US 2013/0167235 A1 Jun. 27, 2013

(51) Int. Cl.
*G06F 11/00* (2006.01)
*G06F 21/56* (2013.01)

(52) U.S. Cl.
CPC .................... *G06F 21/56* (2013.01)

(58) Field of Classification Search
CPC ...... G06F 21/568; G06F 21/56; G06F 21/554; G06F 21/566; G06F 11/1469; G06F 21/562; G06F 11/1448; G06F 11/1471; H04L 63/145; H04L 63/1416
USPC ..................................................... 726/22, 24
See application file for complete search history.

(56) References Cited

U.S. PATENT DOCUMENTS

| 7,222,143 | B2 * | 5/2007 | Childs et al. | |
| 7,784,098 | B1 * | 8/2010 | Fan | G06F 11/1471 726/24 |
| 7,934,229 | B1 | 4/2011 | Vogel | |
| 8,930,423 | B1 * | 1/2015 | Surampudi | H04L 63/0428 380/259 |

(Continued)

FOREIGN PATENT DOCUMENTS

| CN | 101038562 A | 9/2007 |
| CN | 101154253 A | 4/2008 |

(Continued)

OTHER PUBLICATIONS

"Technology Highlights: Antivirus, Antimalware, Cloud . . . Collective Intelligence", Retrieved at <<http://www.pandasecurity.com/about/panda-technologies/>>, Retrieved Date: Oct. 3, 2011, pp. 2.

(Continued)

*Primary Examiner* — Ali Abyaneh (57) ABSTRACT

An anti-malware program monitors the behavior of a system after a system restore to determine the likelihood of a hidden infection of malicious code still existing after the system restore. The anti-malware program observes the dynamic behavior of the system by monitoring conditions that are likely to signify the possibility of an infection thereby necessitating the need to initiate anti-malware detection. The anti-malware program may observe the restoration history, system settings, malware infection history, to determine the likelihood of an existing hidden infection after a system restore.

18 Claims, 7 Drawing Sheets

(56) References Cited

U.S. PATENT DOCUMENTS

| | | | |
|---|---|---|---|
| 2005/0114411 A1 | 5/2005 | Childs et al. | |
| 2005/0229250 A1* | 10/2005 | Ring | G06F 21/57 726/23 |
| 2006/0137010 A1* | 6/2006 | Kramer et al. | 726/22 |
| 2008/0016572 A1 | 1/2008 | Burkhardt et al. | |
| 2008/0301796 A1* | 12/2008 | Holostov | H04L 63/105 726/12 |
| 2009/0013409 A1* | 1/2009 | Wenzinger | G06F 8/60 726/24 |
| 2009/0037496 A1 | 2/2009 | Chong et al. | |
| 2011/0197279 A1* | 8/2011 | Ueoka | G06F 21/56 726/24 |
| 2011/0214186 A1 | 9/2011 | Khilnani et al. | |
| 2011/0225128 A1 | 9/2011 | Jarrett et al. | |
| 2011/0289584 A1* | 11/2011 | Palagummi | G06F 21/562 726/24 |

FOREIGN PATENT DOCUMENTS

| | | |
|---|---|---|
| CN | 102289524 A | 12/2011 |
| EP | 1679631 A2 | 7/2006 |

OTHER PUBLICATIONS

"How antivirus software and System Restore work together", Retrieved at <<http://support.microsoft.com/kb/831829>>, Retrieved Date: Oct. 3, 2011, pp. 2.

Landesman, Mary, "Disabling System Restore to remove viruses", Retrieved at <<http://antivirus.about.com/od/windowsbasics/a/systemrestore.htm>>, Retrieved Date: Sep. 30, 2011, p. 1.

"First Office Action and Search Report Issued in Chinese Patent Application No. 201210563864.5", Mailed Date: Jan. 7, 2015, 12 pages.

International Preliminary Report on Patentability Issued in PCT Patent Application No. PCT/US2012/069978, Mailed Date: Jul. 3, 2014, 6 pages.

"Introducing Microsoft Anitmalware Technologies", Published Date: Jun. 2011, Available at: http://www.microsoft.com/en-in/download/confirmation.aspx?id=26643, pp. 21.

"Supplementary Search Report Issued in European Patent Application No. 12860785.0", Mailed Date: Jul. 9, 2015, 6 pages.

"Second Office Action Issued in Chinese Patent Application No. 201210563864.5", Mailed Date: Jul. 20, 2015, 7 pages.

\* cited by examiner

AUGMENTING SYSTEM RESTORE WITH MALWARE DETECTION

BACKGROUND

A computer anti-malware program aims to detect, prevent, and remove malicious code from executing on a computing device and creating unwanted consequences. Malware may take the form of a computer virus, computer worm, spyware, adware, a Trojan horse, a rootkit, and so forth. Malware or malicious code may add, delete, or tamper with segments of programs, files, memory locations, or boot sectors.

An anti-malware program may be utilized to scan storage devices for files and memory locations that may have been infected and corrupted. The anti-malware program may scan a file when it is installed onto a computer system or whenever the file is opened. The anti-malware program may also be scheduled to scan files or memory locations at regularly scheduled intervals. When malware is detected, remediation may be performed to repair a corrupted portion of a file, to restore the corrupted file to a clean state, or to remove the infected portion from a file. However, the remedial measures may not be sufficient since the source of the infection may still be present after the remediation.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Anti-malware detection is performed after a system restoration that restores an operating system in a computing device in order to ensure the integrity of a system from a hidden infection that may be residing in user files. An anti-malware program monitors the dynamic behavior of a system for conditions that signify the possibility of an infection thereby necessitating the need to initiate malware detection. The indicators utilize conditions exhibited during the operation of the system that are more likely to be predictive of an infection. Such conditions may include the restoration history, the infection history of the system, the detection of disabled security settings, and so forth. Heuristic rules are applied to determine whether or not malware detection is warranted when a condition occurs and the level of detection that may be needed.

These and other features and advantages will be apparent from a reading of the following detailed description and a review of the associated drawings. It is to be understood that both the foregoing general description and the following detailed description are explanatory only and are not restrictive of aspects as claimed.

DETAILED DESCRIPTION

Various embodiments are directed to a technology that augments a system restore with anti-malware detection in order to ensure the integrity of a system. A system restore is often performed by a user or system administrator when a widespread malware infection is highly probable and restores an operating system to a previous state. The operating system may be restored from an installation media or from a partition in a storage device. However, the user files, which may not have been restored, may be infected with malware and present a risk for re-infecting the operating system files.

An anti-malware program may observe the dynamic behavior of a system for conditions that signify the possibility of an infection thereby necessitating the need to initiate malware detection. The indicators utilize conditions exhibited during the operation of the system and heuristic rules that are more likely to be predictive of an infection. Attention now turns to a more detailed description of such a system.

Figure 1:
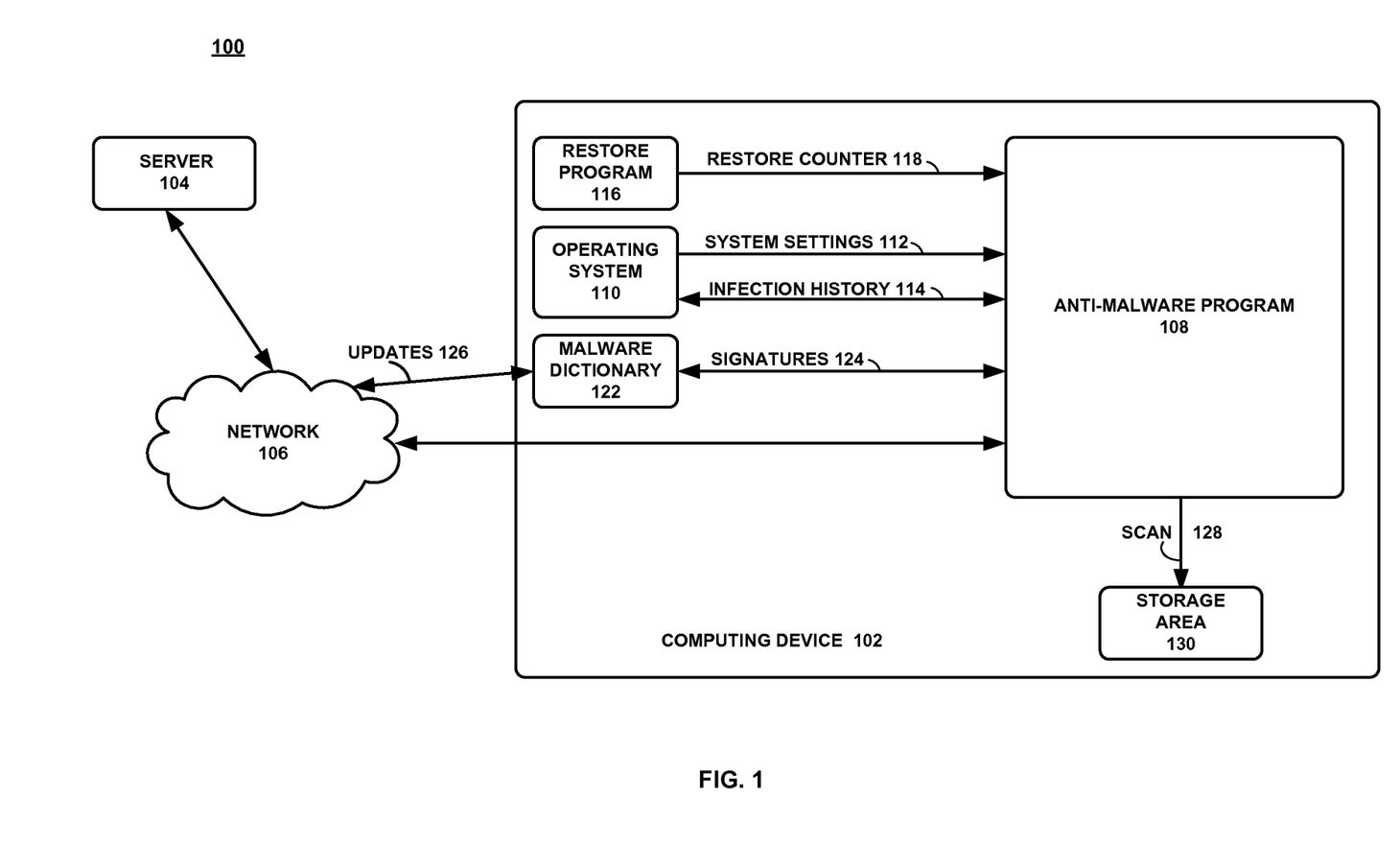
FIG. 1 illustrates an exemplary system that augments a system restore with malware detection.

FIG. 1 illustrates a block diagram of an exemplary system 100 that may include a computing device 102 and a server 104 communicatively coupled through a network 106. Although the system 100 as shown in FIG. 1 has a limited number of elements in a certain topology, it may be appreciated that the system 100 may include more or less elements in alternate topologies as desired for a given implementation.

The computing device 102 and the server 104 may be any type of electronic device capable of executing programmable instructions such as, without limitation, a mobile device, a personal digital assistant, a mobile computing device, a smart phone, a cellular telephone, a handheld computer, a server, a server array or server farm, a web server, a network server, an Internet server, a work station, a mini-computer, a mainframe computer, a supercomputer, a network appliance, a web appliance, a distributed computing system, multiprocessor systems, or combination thereof. The network 106 may be any type of communications link capable of facilitating communications between the computing device 102 and the server 104, utilizing any communications protocol and in any configuration, such as without limitation, a wired network, wireless network, or combination thereof. It will be appreciated that the network connections shown are exemplary and other means of establishing a communications link between the computing device 102 and the server 104 may be used as well.

The computing device 102 may include an anti-malware program 108 that monitors, detects, and attempts to prevent malicious code from infecting resources on the computing device 102. A resource may be a file, program, registry, operating system configurations and settings, and so forth. Malware or malicious code may attempt to prevent the anti-malware program to add, delete, or tamper with segments of resources and/or storage areas and cause unauthorized and unwanted consequences. Malware may be a computer virus, computer worm, spyware, adware, a Trojan horse, a rootkit, and the like. The anti-malware program 108 may also remediate an infection by restoring the infected resource with a clean version, remove the infection from a resource, or quarantine the resource. The anti-malware program 108 may be part of an operating system, security application, or other software application. In addition, the anti-malware program 108 may be a stand-alone executable program that may reside in the computing device or execute from a remote server through a web browser. The embodiments are not limited in this manner.

The anti-malware program 108 may be a sequence of computer program instructions, that when executed by a processor, causes the processor to perform methods and/or operations in accordance with a prescribed task. The anti-malware program 108 may be implemented as program code, programs, procedures, module, code segments, program stacks, middleware, firmware, methods, routines, and so on. The executable computer program instructions may be implemented according to a predefined computer language, manner or syntax, for instructing a computer to perform a certain function. The instructions may be implemented using any suitable high-level, low-level, object-oriented, visual, compiled and/or interpreted programming language.

The computing device 102 may include an operating system 110 that manages and controls the system resources, such as the hardware devices connected to the computing device 102, and the software applications that execute therein. The operating system 110 may store system settings 112 that are used to control certain features provided by the operating system 110. The system settings 112 may control performance options (e.g., processor scheduling, virtual memory paging file size, memory usage, etc.), display options (e.g., type of wallpaper, location of icons, display of windows, colors, sound, etc.), network settings (e.g., browser options, bookmarks, home page URL, etc.), email options (e.g., mail rules, views in the mailbox, mail server, etc.), and the like.

The system settings 112 may include security settings that protect the computer system from unwanted actions and consequences. For example, the security settings may include operating system update settings, firewall settings, browser settings, malware dictionary update settings, user access control settings, and so forth. An operating system update setting, when enabled, allows the computing device 102 to receive updates to the operating system, such as security updates, vulnerability fixes, bug fixes, and so on. A firewall setting enables a firewall to monitor network transmissions in order to prevent unauthorized access. The browser settings allow the browser to analyze downloaded web pages for suspicious characteristics, check for well known malicious web sites, check downloaded files for malicious software, and so forth. The malware dictionary settings allow the computing device 102 to control the manner in which updates are made to a malware dictionary. The user access control settings prevent unauthorized access to crucial settings that when modified affect the operation of the computing device.

The operating system 110 may also include an infection history 114 that tracks previous malware infections within the computing device 102. The infection history 114 may indicate the day and time an infection was detected, the physical location of the infection, the type of infection, and so forth.

A restore program 116 may be a software application that restores the operating system 110 or files to a previous uninfected or clean state. The restore program 116 may restore the operating system files from an installation media (e.g., CD, DVD, flash drive, etc.), a partition of a hard drive, or a remotely located storage device. The restore program 116 may restore the resources or storage areas back to a restore point known not to have an infection. A restore point may be generated upon the occurrence of an important event or periodically in accordance with a schedule. For example, the restore program 116 may monitor resources for modifications and store a copy of the resource or storage area before the modifications are made. The restore program 116 may also be configured to record and store certain storage areas and/or resources as needed. In the event of a problem, the restore program 116 may restore the resource and/or storage area back to the restore point chosen by the user.

A restore counter 118 may be utilized to determine the number of times that a system restoration has occurred within a particular time frame. A system restoration may be initiated by a user or system administrator upon the occurrence of a catastrophic event or by the user. The restore program 116 will update the restore counter 118 each time a system restore operation is performed.

The computing device 102 may also include a malware dictionary 122 that includes signatures 124 used to identify malware. A signature 124 may be a hash-based code or other type of coded representation that identifies a malware program. Variants of a well known malware program may be created that have a similar behavior to a well known malware program with a different signature. Heuristic rules may be used to determine the signature 124 of a malware program. The malware dictionary 122 is continuously updated to include the signatures of newly detected malware programs and their variants. The updates 126 may be provided by a server 104 hosting a trusted service that specializes in aggregating data pertaining to malware programs from various sources or from other computing systems connected to the computing device 102.

In several embodiments, the server 104 may be hosting an application store that provides the computing device 102 with software applications downloaded through a licensing arrangement. The application store may provide the computing device with updates 126 of previously found malware programs that may have been contained in a software application downloaded to the computing device 102. The updates 126 may contain signatures of known malware programs that are stored in the malware dictionary 122.

The anti-malware program 108 may receive data from various components of the computing device 102 in order to analyze the behavior of the system. The anti-malware program 108 may utilize the restore counter 118, the system settings 112, and the infection history 114 as indicators of the dynamic behavior of the system which are applied against a set of heuristic rules. The result of the analysis is to predict the risk level of an infection and the need to scan the storage areas according to the predicted risk level.

Upon determining the threat of a risk and the associated risk level, the anti-malware program may initiate a scan operation 128 to a storage area 130. The storage area 130 may be used to store files and data used in the computing device 102. The storage area 130 may be implemented as a semiconductor memory device, a computer-readable media, a hard disk drive, any combination thereof, or as any other type of device capable of storing data.

In various embodiments, the system 100 described herein may comprise a computer-implemented system having multiple elements, programs, procedures, modules. As used herein, these terms are intended to refer to a computer-related entity, comprising either hardware, a combination of hardware and software, or software. For example, an element may be implemented as a process running on a processor, a hard disk drive, multiple storage drives (of optical and/or magnetic storage medium), an object, an executable, a thread of execution, a program, and/or a computer. By way of illustration, both an application running on a server and the server may be an element. One or more elements may reside within a process and/or thread of execution, and an element may be localized on one computer and/or distributed between two or more computers as desired for a given implementation. The embodiments are not limited in this manner The various elements of system 100 may be communicatively coupled via various types of communications medium as indicated by various lines or arrows. The elements may coordinate operations between each other. The coordination may involve the uni-directional or bi-directional exchange of information. For instance, the elements may communicate information in the form of signals communicated over the communications medium. The information may be implemented as signals allocated to various signal lines. In such allocations, each message is a signal. Further embodiments, however, may alternatively employ data messages. Such data messages may be sent various connections. Exemplary connections include parallel interfaces, serial interfaces, and bus interfaces.

Attention now turns to a discussion of the operations for the embodiments with reference to various exemplary methods. It may be appreciated that the representative methods do not necessarily have to be executed in the order presented, or in any particular order, unless otherwise indicated. Moreover, various activities described with respect to the methods can be executed in serial or parallel fashion, or any combination of serial and parallel operations. The methods can be implemented using one or more hardware elements and/or software elements of the described embodiments or alternative embodiments as desired for a given set of design and performance constraints. For example, the methods may be implemented as logic (e.g., computer program instructions) for execution by a logic device (e.g., a general-purpose or specific-purpose computer).

Figure 2:
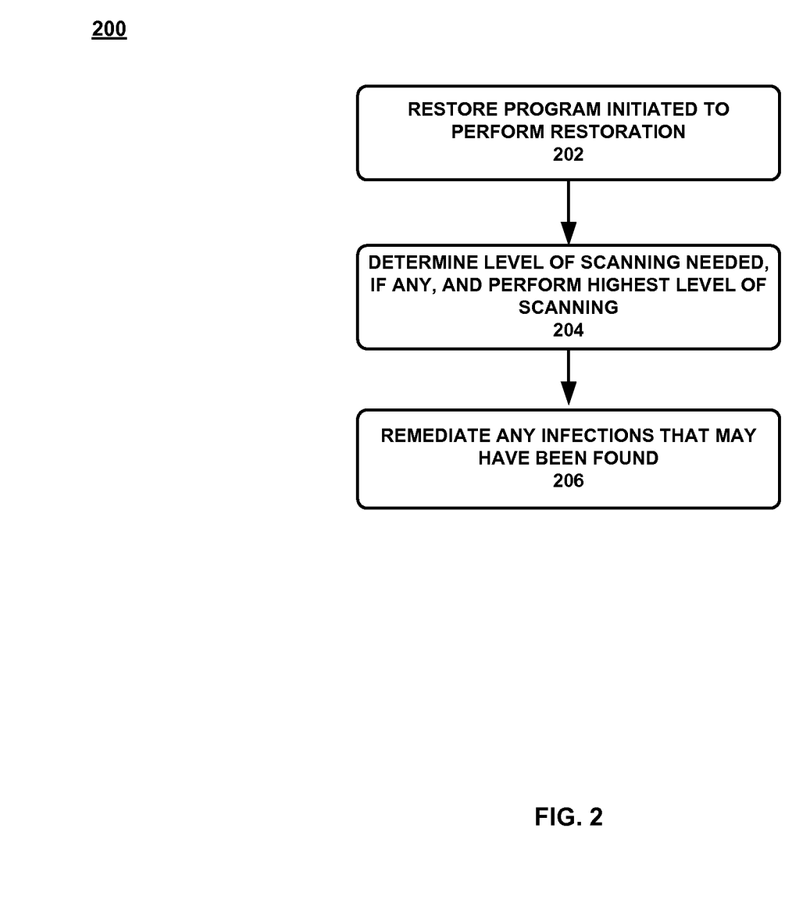
FIG. 2 is a flow diagram illustrating a first exemplary method.

FIG. 2 illustrates a flow diagram of an exemplary method 200 for augmenting a system restore with malware detection. It should be noted that the method 200 may be representative of some or all of the operations executed by one or more embodiments described herein and that the method can include more or less operations than that which is described in FIG. 2.

A system restore operation may be initiated to restore the operating system 110 files (block 202). The anti-malware program 108 may then be initiated to determine the level of scanning desired based on the behavior of the system and to scan at the highest level determined (block 204). The anti-malware program 108 may execute during the system restoration or after the system restoration completes. The level of scanning may include a deep scan level and/or a user file scan level. A deep scan level scans every file and all memory locations in the storage area 130. A user file scan level scans the user files, operating system files, and all memory locations in the storage area 130. The deep scan level is a higher level of scanning than the user file scan level and as such, takes precedence over the user files scan level.

If the anti-malware program 108 detects an infected file or area of the storage area 130, then an appropriate remediation measure is taken (block 206). The remediation measure may restore a file or area of the storage area 130, remove the infected file or portion thereof, quarantine the file, and so forth (block 206).

Figure 3:
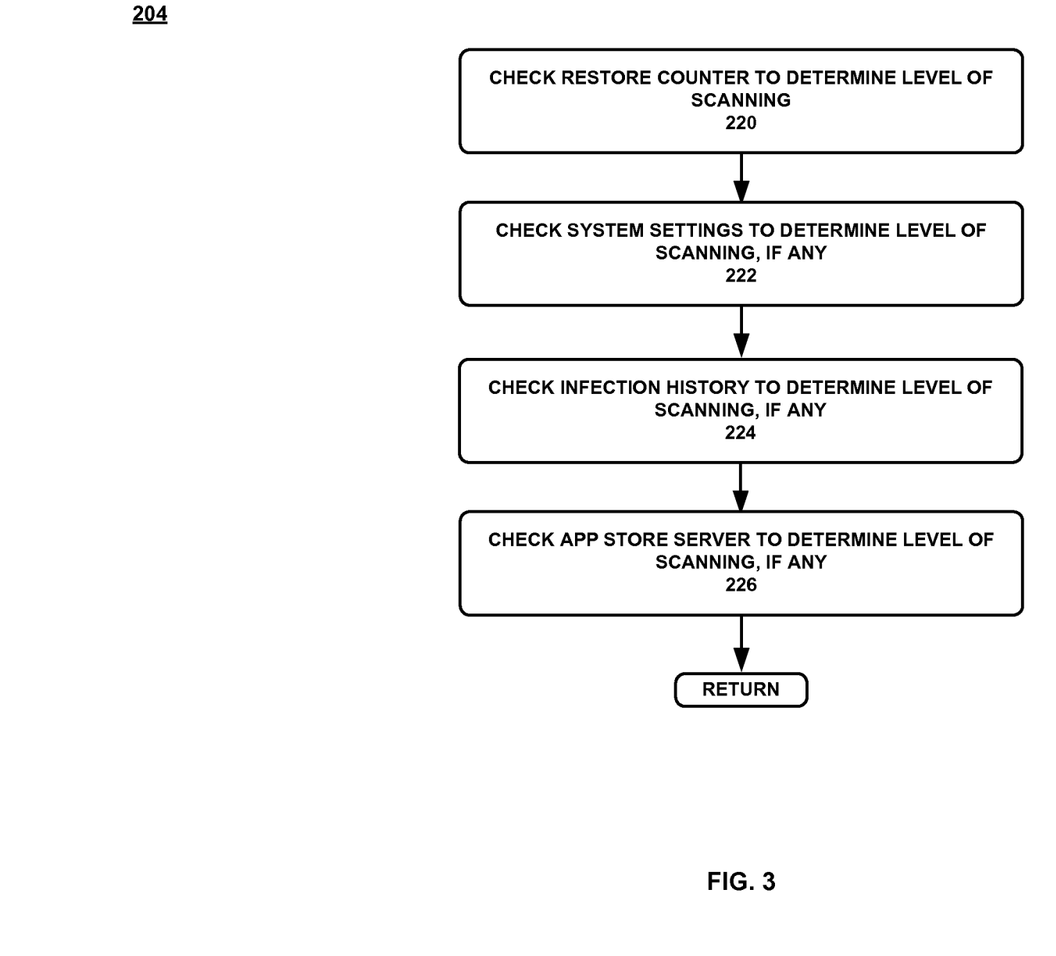
FIG. 3 is a flow diagram illustrating a second exemplary method.

FIG. 3 is a flow diagram illustrating an exemplary method 204 for determining whether scanning may be needed. It should be noted that the method 204 may be representative of some or all of the operations executed by one or more embodiments described herein and in alternate configurations. The method can include more or less operations than that which is described in FIG. 3 and the order in which each check is made may be performed differently than the order shown in FIG. 3. Furthermore, the checks performed in each block shown in FIG. 3 may be performed in parallel with other checks. The embodiments are not constrained in this manner.

Figure 4:
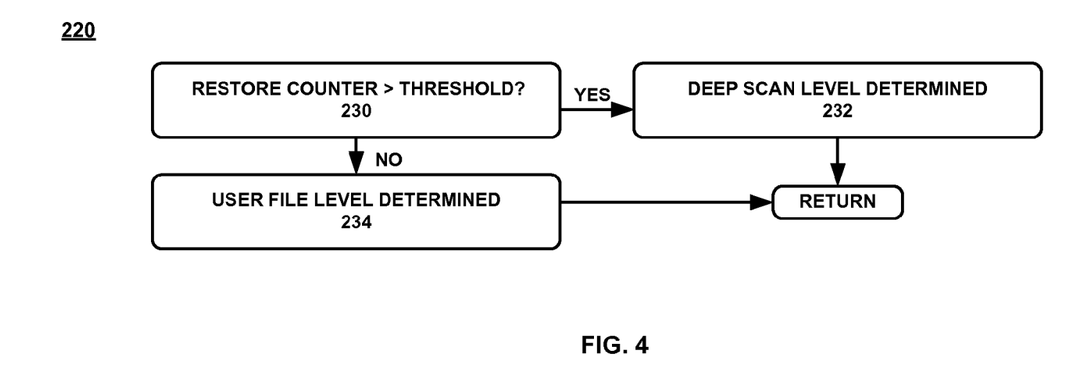
FIG. 4 is a flow diagram illustrating a third exemplary method.

The anti-malware program 108 may check the value of the restore counter 118 to determine the level of scanning that may be needed (block 220). The restore counter 118 may be used to reflect the restoration history of the computing device 102. Referring to FIG. 4, in the event the restore counter 118 exceeds a threshold (block 230-yes), then a deep scan level may be determined and set (block 232). The threshold may be a configurable value that signifies a potential risk of infection based on too many restorations having been performed. If the threshold has not been met (block 230-no), then a user file level scan is determined and set (block 234). The scan of the user files may be needed in the event the restoration restored only system-level files, such as the operating system files, and not user files where the source of an infection may be hidden.

Figure 5:
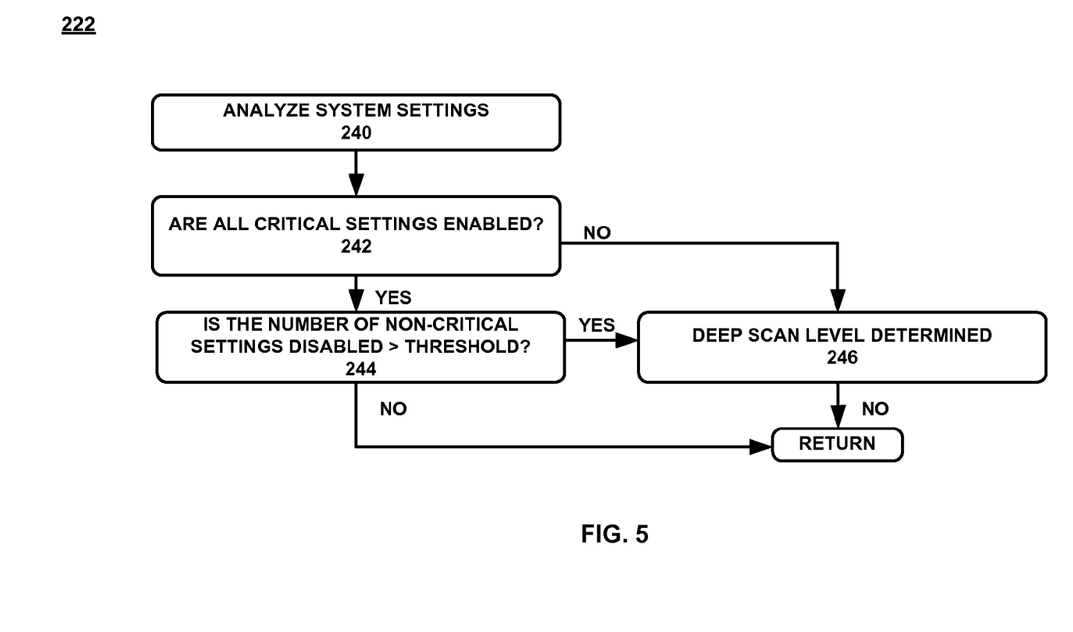
FIG. 5 is a flow diagram illustrating a fourth exemplary method.

Referring back to FIG. 3, the anti-malware program 108 may check certain system settings to determine whether or not scanning is needed and if so, the level scanning needed (block 222). Referring to FIG. 5, the anti-malware program 108 may analyze certain system settings which may be classified as critical and non-critical (block 240). In several embodiments, the security settings, such as the operating system update settings, firewall settings, browser settings, malware dictionary update settings, and user access control settings, may be deemed critical settings. If all of the critical settings are not enabled (block 242-no), then the anti-malware program 108 determines that a deep scan level is warranted (block 246). Otherwise (block 242-yes), if the number of non-critical settings that are disabled exceeds a threshold amount (block 244-yes), then a deep scan level is warranted (block 246). Otherwise, when all critical and non-critical settings are enabled (block 244-no), the process returns.

Figure 6:
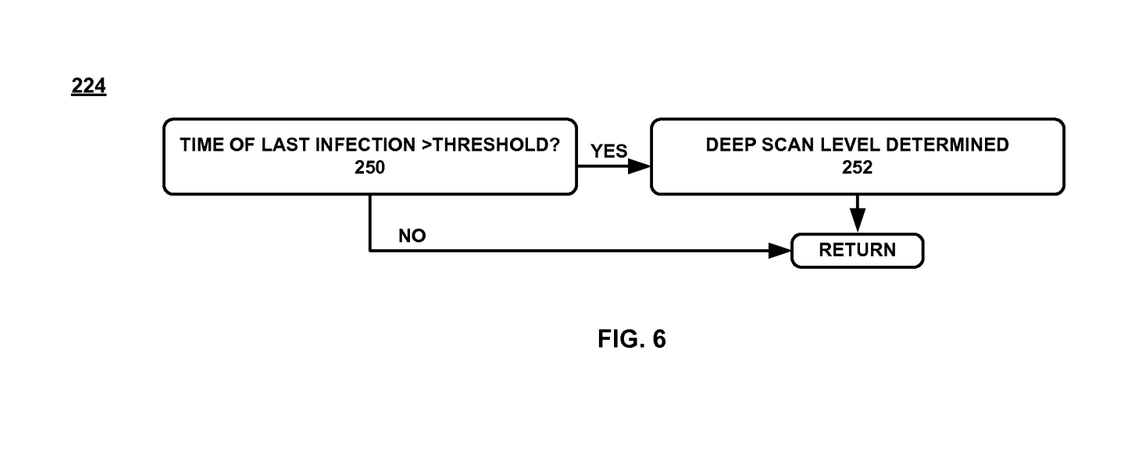
FIG. 6 is a flow diagram illustrating a fifth exemplary method.

Referring back to FIG. 3, the anti-malware program 108 may check the infection history 114 to determine whether scanning is needed and if so, the level of scanning needed (block 224). The infection history 114 may be stored in a memory space associated with the operating system 110 and may also be stored in a memory space associated with the anti-malware program 108. Referring to FIG. 6, the anti-malware program 108 may analyze the infection history 114 to determine whether the time since the last infection exceeds a threshold (block 250-yes). If the threshold is exceeded (block 250-yes), then a deep scan level is set (block 252). Otherwise when the threshold is not exceeded (block 250-no), then the process returns.

Figure 7:
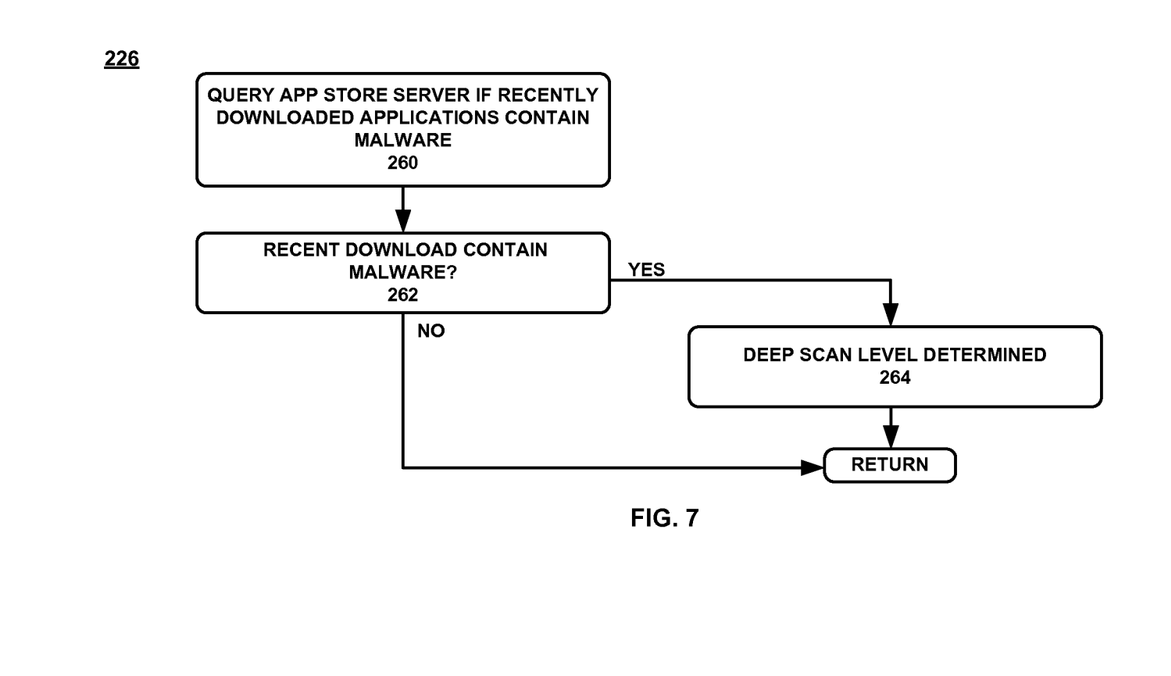
FIG. 7 is a flow diagram illustrating a sixth exemplary method

Referring back to FIG. 3, the anti-malware program 108 may check with a server 104 hosting an application store for known malware programs that are associated with applications that were previously obtained from the application store and downloaded to the computing device 102 (block 226). Referring to FIG. 7, the anti-malware program 108 may query the application store to find out if any recently downloaded applications are known to contain malware or otherwise produce unwanted consequences (block 260). In the event a recently downloaded application is known to contain malware (block 262-yes), then the anti-malware program 108 may determine a deep level scan is warranted (block 264). Otherwise, if the application store is not aware of malware contained in recently downloaded applications (block 262-no), then the process returns.

Figure 8:
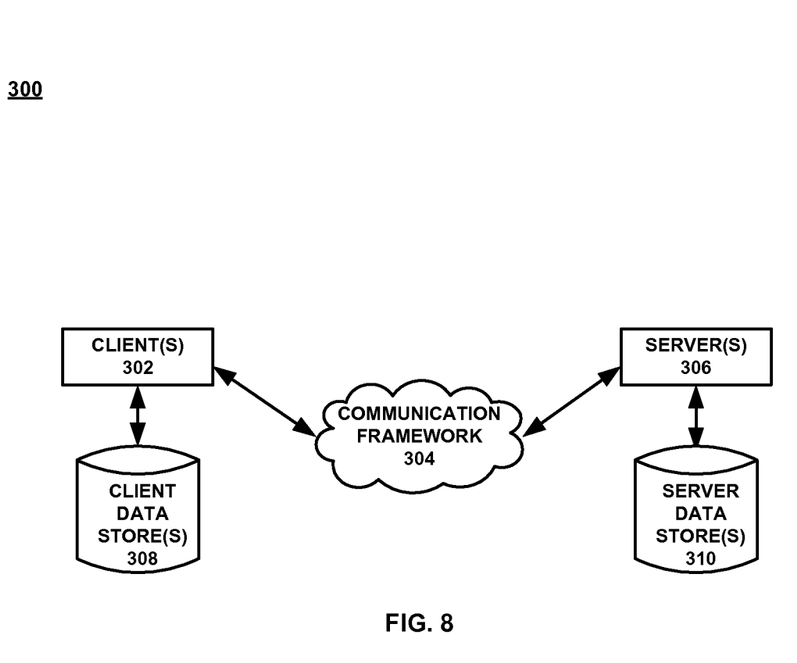
FIG. 8 is a block diagram illustrating an operating environment.

Attention now turns to a discussion of an exemplary operating environment. FIG. 8 illustrates an operating environment 300. It should be noted that the operating environment 300 is exemplary and is not intended to suggest any limitation as to the functionality of the embodiments. The embodiment may be applied to an operating environment 300 having one or more client(s) 302 in communication through a communications framework 304 with one or more server(s) 306. The operating environment 300 may be configured in a network environment, a distributed environment, a multiprocessor environment, or a stand-alone computing device having access to remote or local storage devices.

A client 302 may be embodied as a hardware device, a software module, or as a combination thereof. Examples of such hardware devices may include, but are not limited to, a computer (e.g., server, personal computer, laptop, etc.), a cell phone, a personal digital assistant, or any type of computing device, and the like. A client 302 may also be embodied as a software module having instructions that execute in a single execution path, multiple concurrent execution paths (e.g., thread, process, etc.), or in any other manner A server 306 may be embodied as a hardware device, a software module, or as a combination thereof. Examples of such hardware devices may include, but are not limited to, a computer (e.g., server, personal computer, laptop, etc.), a cell phone, a personal digital assistant, or any type of computing device, and the like. A server 306 may also be embodied as a software module having instructions that execute in a single execution path, multiple concurrent execution paths (e.g., thread, process, etc.), or in any other manner The communications framework 304 facilitates communications between the client 302 and the server 306. The communications framework 304 may embody any type of communications medium, such as wired or wireless networks, utilizing any communication protocol. Each client(s) 302 may be coupled to one or more client data store(s) 308 that store information local to the client 302. Each server(s) 306 may be coupled to one or more server data store(s) 310 that store information local to the server 306.

Figure 9:
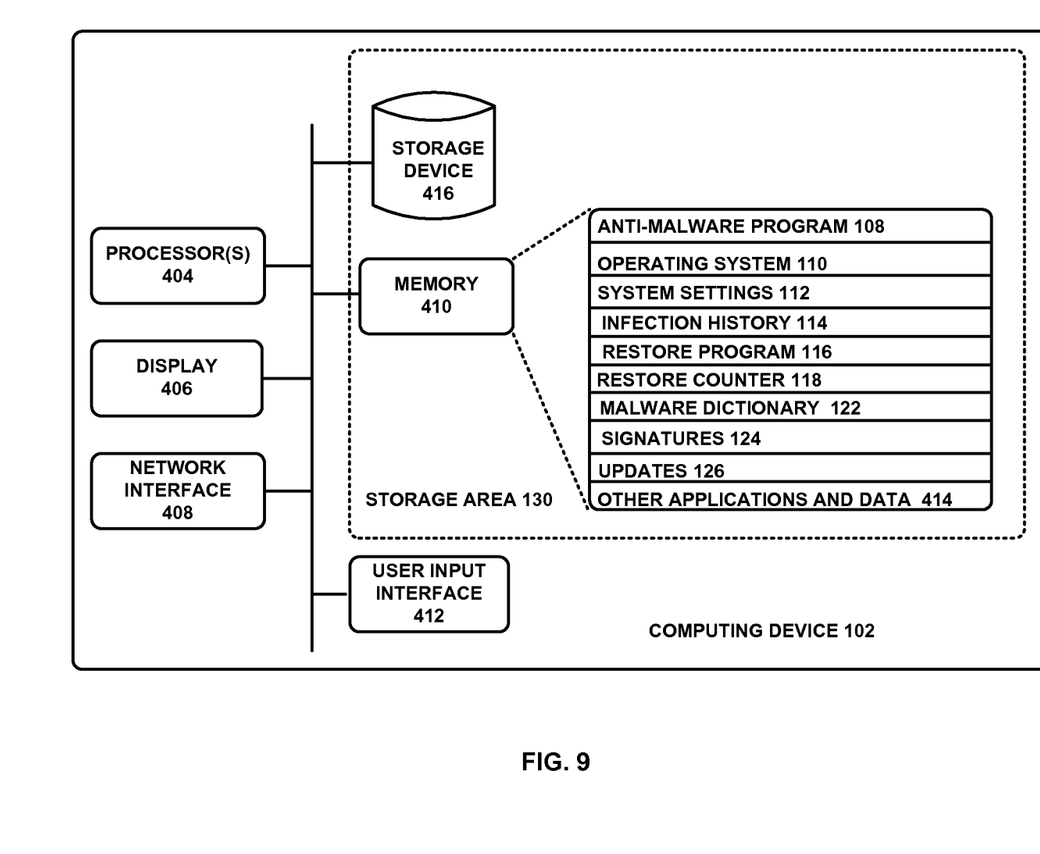
FIG. 9 is a block diagram illustrating an exemplary computing device.

FIG. 9 illustrates a block diagram of an exemplary computing device 102. The computing device 102 may have one or more processors 404, a display 406, a network interface 408, a storage area 130, and a user input interface 412. A processor 404 may be any commercially available processor and may include dual microprocessors and multi-processor architectures. The display 406 may be any type of visual display unit. The network interface 408 facilitates wired or wireless communications between the computing device 102 and a communications framework. The user input interface 412 facilitates communications between the computing device 102 and input devices, such as a keyboard, mouse, etc.

The storage area may be composed of a memory 410 and a storage device 416. The storage device 416 may be magnetic storage, volatile storage, non-volatile storage, optical storage, DVD, CD, floppy disk drive, hard disk drive, and the like. The memory 410 may be any computer-readable storage media that may store executable procedures, applications, and data. The computer-readable media does not pertain to propagated signals, such as modulated data signals transmitted through a carrier wave. It may be any type of memory device (e.g., random access memory, read-only memory, etc.), magnetic storage, volatile storage, non-volatile storage, optical storage, DVD, CD, floppy disk drive, hard disk drive, and the like. The memory 410 may also include one or more external storage devices or remotely located storage devices. The memory 410 may contain instructions and data as follows:

an anti-malware program 108;
an operating system 110;
system settings 112;
an infection history 114;
a restore program 116;
a restore counter 118;
a malware dictionary 122;
signatures 124;
updates 126; and
various other applications and data 414.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

Various embodiments may be implemented using hardware elements, software elements, or a combination of both. Examples of hardware elements may include devices, components, processors, microprocessors, circuits, circuit elements, integrated circuits, application specific integrated circuits, programmable logic devices, digital signal processors, field programmable gate arrays, memory units, logic gates and so forth. Examples of software elements may include software components, programs, applications, computer programs, application programs, system programs, machine programs, operating system software, middleware, firmware, software modules, routines, subroutines, functions, methods, procedures, software interfaces, application program interfaces, instruction sets, computing code, code segments, and any combination thereof. Determining whether an embodiment is implemented using hardware elements and/or software elements may vary in accordance with any number of factors, such as desired computational rate, power levels, bandwidth, computing time, load balance, memory resources, data bus speeds and other design or performance constraints, as desired for a given implementation.

Some embodiments may comprise a storage medium to store instructions or logic. Examples of a storage medium may include one or more types of computer-readable storage media capable of storing electronic data, including volatile memory or non-volatile memory, removable or non-removable memory, erasable or non-erasable memory, writeable or re-writeable memory, and so forth. Examples of the logic may include various software elements, such as programs, procedures, module, applications, code segments, program stacks, middleware, firmware, methods, routines, and so on. In an embodiment, for example, a computer-readable storage medium may store executable computer program instructions that, when executed by a processor, cause the processor to perform methods and/or operations in accordance with the described embodiments. The executable computer program instructions may be implemented according to a predefined computer language, manner or syntax, for instructing a computer to perform a certain function. The instructions may be implemented using any suitable high-level, low-level, object-oriented, visual, compiled and/or interpreted programming language.

What is claimed:

1. A computer-implemented method, comprising:
    executing at least one system restore in a computing device, the system restore restoring a first set of resources stored in the computing device;
    analyzing a plurality of conditions to determine if malware detection is needed during system restoration, the plurality of conditions including restoration history, system settings and infection history;
    in response to determining that malware detection is needed, selecting a level of scanning from at least one of a deep scan level or a user scan level, wherein the deep scan level is selected when at least one of the plurality of conditions exceeds a threshold, wherein the user scan level is selected when none of the plurality of conditions exceeds a threshold; and
    scanning, during the system restoration, a second set of resources that were not restored, at the selected level of scanning.

2. The computer-implemented method of claim 1, wherein selecting the level of scanning is performed during the system restore.

3. The computer-implemented method of claim 1, wherein selecting the level of scanning further comprises:
    setting the user scan level if a number of previously-executed restore operations does not meet a threshold.

4. The computer-implemented method of claim 1, wherein selecting the level of scanning further comprises:
    setting the deep scan level if a number of previously-executed restore operations exceeds a threshold.

5. The computer-implemented method of claim 1, wherein selecting the level of scanning further comprises:
    setting the deep scan level when a critical system setting is not enabled.

6. The computer-implemented method of claim 1, wherein selecting the level of scanning further comprises:
    setting the user scan level when a non-critical system setting is not enabled for at least a threshold amount of non-critical system settings.

7. The computer-implemented method of claim 1, wherein selecting the level of scanning further comprises:
    setting the deep scan level when a number of previous infections exceeds a threshold.

8. The computer-implemented method of claim 1, wherein selecting the level of scanning further comprises:
    contacting an application store for data pertaining to previously obtained applications downloaded to the computing device; and
    setting the deep scan level when a known malware program was previously downloaded to the computing device.

9. A device, comprising:
    at least one processor and a memory; the at least one processor configured to:
    perform a system restoration onto the device, the system restoration restoring a first set of resources stored on the device;
    analyze, during the system restoration, for occurrence of a plurality of system conditions, the plurality of system conditions including restoration history, system settings, and infection history;
    determine whether malware detection is warranted during the system restoration based on the occurrence of one or more of the plurality of system conditions; and
    perform, during the system restoration, a level of malware detection based on the occurrence of the one or more of the plurality of system conditions on a second set of resources that were not restored, the level of malware detection selected from at least one of a deep scan level or a user scan level, wherein the deep scan level is selected when at least one of the plurality of conditions exceeds a threshold, wherein the user scan level is selected when none of the plurality of conditions exceeds a threshold.

10. The device of claim 9, wherein the at least one processor is further configured to:
    utilize critical settings associated with an operating system to determine whether malware detection is warranted.

11. The device of claim 9, wherein the system settings include one or more of: operating system update settings, firewall settings, browser settings, malware dictionary update settings, and user access control settings.

12. The device of claim 9, wherein determine whether malware detection is warranted during the system restoration based on the occurrence of one or more of the plurality of system conditions further comprises analyzing whether the occurrence of the one or more of the plurality of system conditions meets a specific threshold.

13. A system, comprising:
    a memory including an operating system; and
    at least one processor programmed to:
    restore one or more files of the operating system while at least one resource of the system is not restored;
    analyze, during the restore, a plurality of conditions to determine whether malware detection is warranted, the plurality of conditions indicating restoration history, system settings, and infection history;
    determine a level of malware detection, the level of malware detection selected from at least one of a deep scan level or a user scan level, wherein the deep scan level is selected when at least one of the plurality of conditions exceeds a threshold, wherein the user scan level is selected when none of the plurality of conditions exceeds a threshold; and
    apply, during the restore, the level of malware detection to at least one resource of the system that was not restored.

14. The system of claim 13, wherein the deep scan level is selected when a critical system setting is not enabled.

15. The system of claim 13, wherein the system settings include one or more of: operating system update settings, firewall settings, browser settings, malware dictionary update settings, and user access control settings.

16. The system of claim 15, wherein the at least one processor is further configured to set a deep scan level when a number of system settings that are disabled exceeds a threshold.

17. The system of claim 13, wherein the deep scan level is selected when a known malware program was previously downloaded.

18. The system of claim 13, wherein the at least one processor is further programmed to:
utilize information provided by an application store to determine whether malware detection is warranted.

\* \* \* \* \*